United States Patent [19]

Dodson, Jr.

[11] Patent Number: 5,412,216
[45] Date of Patent: May 2, 1995

[54] METHOD AND APPARATUS FOR IDENTIFYING A RADIONUCLIDE IN A LIQUID SCINTILLATION SAMPLE

[75] Inventor: Charles L. Dodson, Jr., Orange, Calif.

[73] Assignee: Beckman Instruments, Inc., Fullerton, Calif.

[21] Appl. No.: 145,378

[22] Filed: Oct. 29, 1993

[51] Int. Cl.$^6$ ............................................. G01T 1/204
[52] U.S. Cl. ..................................... 250/364; 250/362
[58] Field of Search ........................ 250/362, 364, 328

[56] References Cited

U.S. PATENT DOCUMENTS 4,075,480 2/1978 Horrocks ............................ 250/328
4,742,226 5/1988 De Filippis ........................ 250/364

OTHER PUBLICATIONS

Mantel, J., The Beta Ray Spectrum and the Average Beta Energy of Several Isotopes of Interest in Medicine and Biology, *International Journal of Applied Radiatio and Isotopes*, vol. 23, pp. 407–413, (1972).

Primary Examiner—Carolyn E. Fields
Attorney, Agent, or Firm—William H. May; Arnold Grant; Janis C. Henry

[57] ABSTRACT

Methods and apparatus are provided for identifying a radionuclide in a liquid sample containing at least one unknown radionuclide, in which specific properties which are essentially linear over extended quench ranges are employed as the primary basis for identifying the radionuclide. For example, the endpoint or maximum energy of a sample is related to Mantel's average energy or a property proportional to the average energy (such as isotope center number) in order to establish characteristic relationships for radionuclides of interest; comparison of measured values with characteristic values for specific radionuclides may in some cases be sufficient to identify a radionuclide unambiguously. The relationships between isotope center number, full width of the spectrum at half its maximum height and maximum energy may be exploited to provide a pair of characteristic equations for each radionuclide. In those instances where some ambiguity might arise, other features of the spectrum (such as maximum peak height or number of peaks present) are employed to distinguish between nuclides which are not clearly identified by the first step.

17 Claims, 3 Drawing Sheets

METHOD AND APPARATUS FOR IDENTIFYING A RADIONUCLIDE IN A LIQUID SCINTILLATION SAMPLE

BACKGROUND OF THE INVENTION

The present invention relates to methods and apparatus for identifying a radionuclide in a liquid sample containing at least one unknown radionuclide.

While most samples presented to liquid scintillation counters consist of a single known radionuclide of which the activity is to be measured, occasionally the specific radionuclide is unknown or some doubt may exist concerning its identity. For example, labels on sample vials may be exchanged. In addition, it may be appropriate to confirm the identity of radionuclides in materials received from outside sources. Some knowledge of the identity of the primary radionuclide in waste materials would also be useful.

It has in most instances heretofore been possible to carry out experiments which produce results consistent with the presence of any one of three or four possible nuclides over a limited quench range. However, a method for the qualitative identification of a nuclide over a large quench range for a large class of nuclides would clearly be desirable.

It has been demonstrated that the identity of any one of a group of 59 nuclides could be determined, provided the sample being tested was unquenched [J. Mantel, Int. J. Appl. Rad. Isot. 23:407 (1972)]. The average energy of an unknown nuclide's spectrum was compared with a previously-calculated table of such values, and the unknown was identified as the radionuclide closest in value. This approach was clearly quite limited, as the only values available were those of unquenched samples.

U.S. Pat. No. 4,742,226 to de Phillipis, the entire disclosure of which is hereby incorporated by reference, describes a method for ascertaining the identity of an unknown radionuclide in a test sample by determining an external source quench-indicating parameter and a quench-indicating parameter for the test sample, comparing the observed values to a series of radionuclide equations determined for these parameters for radionuclides of interest, and identifying the radionuclide in the test sample by determining which radionuclide equation is satisfied by the observed values. Pursuant to the method of U.S. Pat. No. 4/742,226, the Spectral Index of a Sample (SIS) was related to a quench parameter provided by the Compton spectrum produced by an external standard. A Compton spectrum is produced by gamma radiation of a sample by a radionuclide outside the sample as an external standard. Electrons are scattered from the sample along with gamma photons of energy lower than the initial gamma radiation. Thus, $$SIS = I + SQ_{ext}$$

wherein I is the intercept and S the slope of a plot of SIS vs. the external standard quench parameter, $Q_{ext}$. The three examples discussed in the patent (tritium, carbon-14 and chlorine-36) depended upon the specific external quench monitor tSIE, which is the transformed Spectral Index of the External Standard.

While this method is of some limited utility, it has several significant disadvantages. It requires the use of an external standard source and some mechanism for positioning the source adjacent the sample. Moreover, the methods of U.S. Pat. No. 4,742,226 require analysis of the resulting Compton spectrum in order to employ the aforementioned formula.

Accordingly, it would be clearly desirable to determine the identity of single radionuclides by methods and apparatus which do not require the use of external sources, source movement mechanisms and the associated analysis of the Compton spectrum. In addition, it would be highly advantageous if two or more spectral characteristics were measured and the resulting information used for confirmation of identity in those cases where there might be some ambiguity. Finally, it would be a significant advantage to provide a method for distinguishing between pairs of differently quenched nuclides (for example, $H^3$ and $Fe^{55}$ or $C^{14}$ and $S^{35}$) which are not distinguishable by heretofore known methods.

SUMMARY OF THE INVENTION

In accordance with the present invention, methods and apparatus are provided for identifying a radionuclide in a liquid sample containing at least one unknown radionuclide, in which specific properties which are essentially linear over extended quench ranges are employed as the primary basis for identifying the radionuclide. In one embodiment of the invention, the endpoint or maximum energy of a sample is related to Mantel's average energy or a property proportional to the average energy (such as isotope center number) in order to establish characteristic relationships for radionuclides of interest. In another embodiment, the relationships between isotope center number, full width of the spectrum at half its maximum height and maximum energy are exploited to provide a pair of characteristic equations for each radionuclide. In those instances where some ambiguity might arise, other features of the spectrum (such as maximum peak height or number of peaks present) are employed to distinguish between nuclides which are not clearly identified by the first step.

BRIEF DESCRIPTION OF THE DRAWING

The invention may be better understood with reference to FIG. 1, which illustrates a typical spectrum obtained using a conventional liquid scintillation counter.

DETAILED DESCRIPTION OF THE INVENTION

Figure 1:
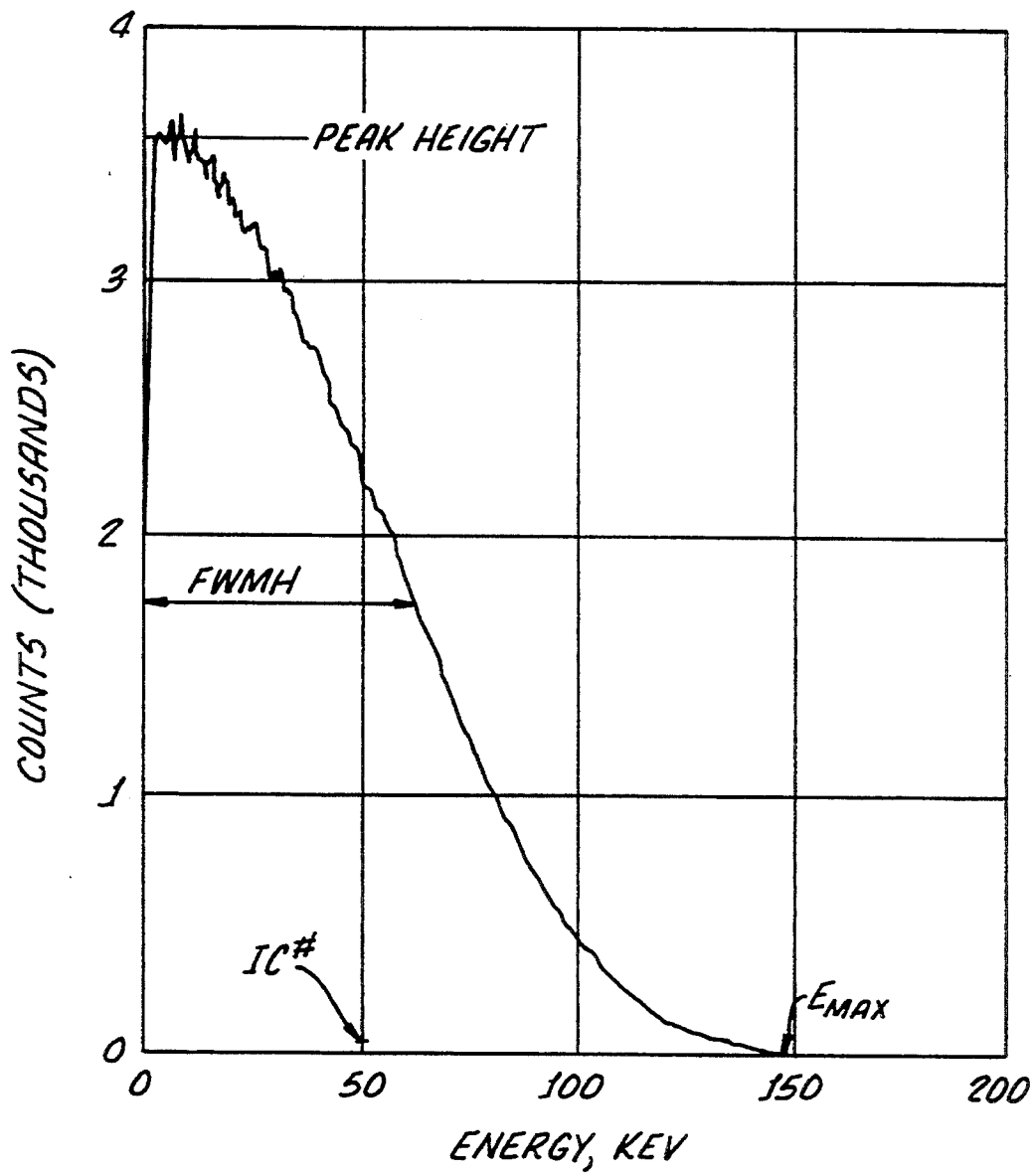

The method of the present invention begins with the generation of a spectrum from a given sample using a conventional liquid scintillation counter. A typical spectrum is illustrated in FIG. 1. From this spectrum, a number of different parameters are determined. One significant property is the isotope center number (IC# or I), which is proportional to the average energy of a nuclide's spectrum. In addition, the maximum energy (E) of the sample is determined. In many instances, these values would be sufficient to enable identification of the unknown nuclide; in some cases, the observed I and E values alone can be sufficient to identify unambiguously a particular radionuclide.

Additional properties of the spectrum may also be useful in discriminating among the possibilities for a given nuclide. One significant property is the full width of the spectrum at half its maximum height (FWHM or F). Other properties which may be used to distinguish among several possibilities include the energy corresponding with the maximum peak height, the number of peaks in a spectrum and the spectral width corresponding with the distance separating the spectral inflection points.

In accordance with the present invention, advantage is taken of the linear relationships between various parameters determined from liquid scintillation spectra of particular nuclides over a reasonable quench range. The H# scale is described by Horrocks in U.S. Pat. No. 4,075,480 (the entire disclosure of which is hereby also incorporated by reference). A reasonable quench range for most radionuclides of interest may be defined as about 0 to about 250 on the H# scale; in particular instances, wider or narrower quench ranges or ranges starting at some value other than zero may be appropriate.

Pursuant to one embodiment of the invention, use is made of one set of characteristic equations for radionuclides of interest relating the endpoint or maximum energy of a sample to Mantel's average energy or a property proportional to the average energy (such as isotope center number). The energy of an average electron (Mantel's average energy) in a Beta spectrum equals the total energy of all emitted electrons, $\Sigma(N_i E_i)$, divided by the number of electrons, $\Sigma(N_i)$, producing the spectrum, or $$E_{avg} = \Sigma(N_i E_i)/\Sigma(N_i)$$

where $E_i$ is the energy of the $N_i$ electron. Pursuant to this embodiment, the characteristic equations for radionuclides of interest take the form $$I = C_1 + S_1 E \tag{1}$$

wherein I is the isotope center number, E is the endpoint or maximum energy of the nuclide, $C_1$ is the intercept of the plot of I versus E, and $S_1$ is the slope of the plot of I versus E. Values for C and S for each radionuclide are determined from measurements of samples containing the radionuclide. An unknown radionuclide may in many instances be identified simply by comparing the observed I and E values with characteristic values established for various radionuclides of interest; in some cases, the observed I and E values ($I_u$ and $E_u$, respectively) can be unambiguously correlated with a particular radionuclide.

When the absolute values of I and E are not sufficient by themselves to permit identification of the radionuclide, the identify of the unknown may be determined by establishing which of the characteristic equations is best satisfied by the E and I values observed for the sample. For example, using the measured value of E for the unknown ($E_u$), I values may be calculated ($I_c$) from each of the equations established for radionuclides of interest. The correct nuclide is then identified as the one with which the difference between $I_u$ and $I_c$ is the smallest.

In accordance with a preferred embodiment of the invention, determination of the identity of an unknown is made using equation (1) in conjunction with another characteristic relationship between spectral parameters:

$$F = C_2 + S_2 E \tag{2}$$

wherein $C_2$ and $S_2$ are the intercept and slope of a plot of F versus E, F is full width of the spectrum at half its maximum height and E is the maximum energy of the sample. Using a set of samples known to contain a given radionuclide, measurement is effected over a reasonable quench range of I, E and F. Given this data, equations (1) and (2) are then determined specifically for each nuclide of interest.

The information obtained from measurement of standards is stored (for example, in a memory device associated with the liquid scintillation counter) to provide a set of characteristic values for all nuclides of interest. It is thus an advantage of the present invention that all measurements necessary to develop appropriate equations are carried out only once and the information stored in the apparatus for future use.

Characteristic values for important radionuclides are provided in Tables I and II. Table I indicates the slope and intercept values for equations (1) and (2) determined after appropriate series of measurements for the 21 nuclides listed; R2 tests the linearity of each equation, with 1 being perfect linearity. Table II reports the upper and lower limits for E and I observed for the radionuclides listed. By carrying out measurements of samples known to contain a given radionuclide over a reasonable quench range and calculations as described herein, values such as are reported in Tables I and II may readily be determined for any radionuclide of interest in a straightforward manner.

TABLE I

| | Values for Characteristic Nuclide Equations | | | | | | |
|---|---|---|---|---|---|---|---|
| | EQUATION (1) | | | | EQUATION (2) | | |
| NUCLIDE | $C_1$ | $S_1$ | R 2 | H# RANGE | $C_2$ | $S_2$ | R 2 |
| Fe55 | 0.5063 | 0.6813 | 0.999885 | 0–310 | −0.71762 | 0.58512 | 0.99774 |
| H3 | 0.97218 | 0.508452 | 0.99987 | 0–315 | −0.19148 | 0.391054 | 0.99961 |
| Ni63 | 0.36267 | 0.49428 | 0.99768 | 0–350 | −0.08483 | 0.33411 | 0.98268 |
| I125 | 2.62042 | 0.360615 | 0.996681 | 0–270 | 0.87537 | 0.067302 | 0.99071 |
| | | | | | 1.467024 | 0.290721 | 0.966 |
| Cr51 | 4.2666 | −0.01507 | 0.910048 | 125–265 | 0.413312 | 0.018941 | 0.9911 |
| S35 | 0.94911 | 0.531232 | 0.999988 | 0–390 | −0.03645 | 0.413778 | 0.99886 |
| C14 | 0.769344 | 0.552258 | 0.999985 | 0–310 | −1.46632 | 0.496742 | 0.99982 |
| Co57 | 3.19087 | 0.10988 | 0.99931 | 0–365 | 0.56383 | 0.052953 | 0.99838 |
| Ca45 | 0.747951 | 0.550363 | 0.999992 | 0–400 | −0.13397 | 0.45084 | 0.99938 |
| Mn54 | 30.4276 | −0.05361 | 0.97504 | 135–310 | 0.54758 | 0.004296 | 0.99599 |
| Am241 | −12.5547 | 1.60026 | 0.999969 | 0–400 | 2.4818 | 0.23305 | 0.99963 |
| I131 | 0.81981 | 0.48976 | 0.99999 | 0–395 | 0.96572 | 0.36817 | 0.99874 |
| Cs137 | −0.49658 | 0.46484 | 0.999985 | 0–400 | 1.16527 | 0.30492 | 0.99741 |
| Cl36 | −3.61257 | 0.757526 | 0.99996 | 0–500 | −6.77431 | 0.776785 | 0.99917 |
| Fe59 | 1.7828 | 0.188807 | 0.99976 | 0–385 | 6.5928 | 0.08854 | 0.98281 |
| Na22 | −1.7768 | 0.34414 | 0.99997 | 0–400 | −2.59497 | 0.26124 | 0.99993 |

TABLE I-continued

| | Values for Characteristic Nuclide Equations | | | | | | |
|---|---|---|---|---|---|---|---|
| | EQUATION (1) | | | | EQUATION (2) | | |
| NUCLIDE | $C_1$ | $S_1$ | R 2 | H# RANGE | $C_2$ | $S_2$ | R 2 |
| P32 | −3.82002 | 0.636764 | 0.99997 | 0–350 | −9.80621 | 0.65126 | 0.99917 |
| Rb86 | −2.50402 | 0.587835 | 0.999993 | 0–400 | −2.3336 | 0.47455 | 0.99846 |
| Sr90 | 0.331613 | 0.346079 | 0.999986 | 0–435 | −0.96946 | 0.152841 | 0.9971 |
| Na24 | −4.7342 | 0.37942 | 0.99989 | 0–400 | −8.7644 | 0.344224 | 0.99974 |
| Zn65 | 12.29 | −0.01181 | 0.911427 | 0–250 | 0.528781 | 0.005362 | 0.997687 |

TABLE II

| | Upper and Lower Limits for E and I | | | |
|---|---|---|---|---|
| | E | | I | |
| NUCLIDE | LOWER | UPPER | LOWER | UPPER |
| Fe55 | 2.8 | 6.6 | 2.4 | 5.1 |
| H3 | 3.6 | 15.3 | 2.79 | 8.8 |
| Ni63 | 9.8 | 47.5 | 4.6 | 23.9 |
| I125 | 9.65 | 49.5 | 9.29 | 20.5 |
| Cr51 | 25.3 | 113 | 2.55 | 3.96 |
| S35 | 15.9 | 118 | 9.45 | 63.7 |
| C14 | 15.8 | 132 | 9.6 | 73.7 |
| Co57 | 18.4 | 115 | 5.2 | 15.8 |
| Ca45 | 24.5 | 185 | 14.1 | 102.7 |
| Mn54 | 87.8 | 550 | 14 | 26.4 |
| Am241 | 75 | 494 | 106 | 780 |
| I131 | 75 | 550 | 35 | 271 |
| Cs137 | 78 | 600 | 36 | 280 |
| Cl36 | 70 | 610 | 50 | 460 |
| Fe59 | 135 | 915 | 24 | 175 |
| Na22 | 145 | 1085 | 44 | 374 |
| P32 | 180 | 1350 | 105 | 860 |
| Rb86 | 170 | 1400 | 99 | 825 |
| Sr90 | 250 | 1460 | 75 | 508 |
| Na24 | 290 | 2155 | 105 | 815 |
| Zn65 | 128 | 730 | 3.71 | 11.5 |

Figure 2:
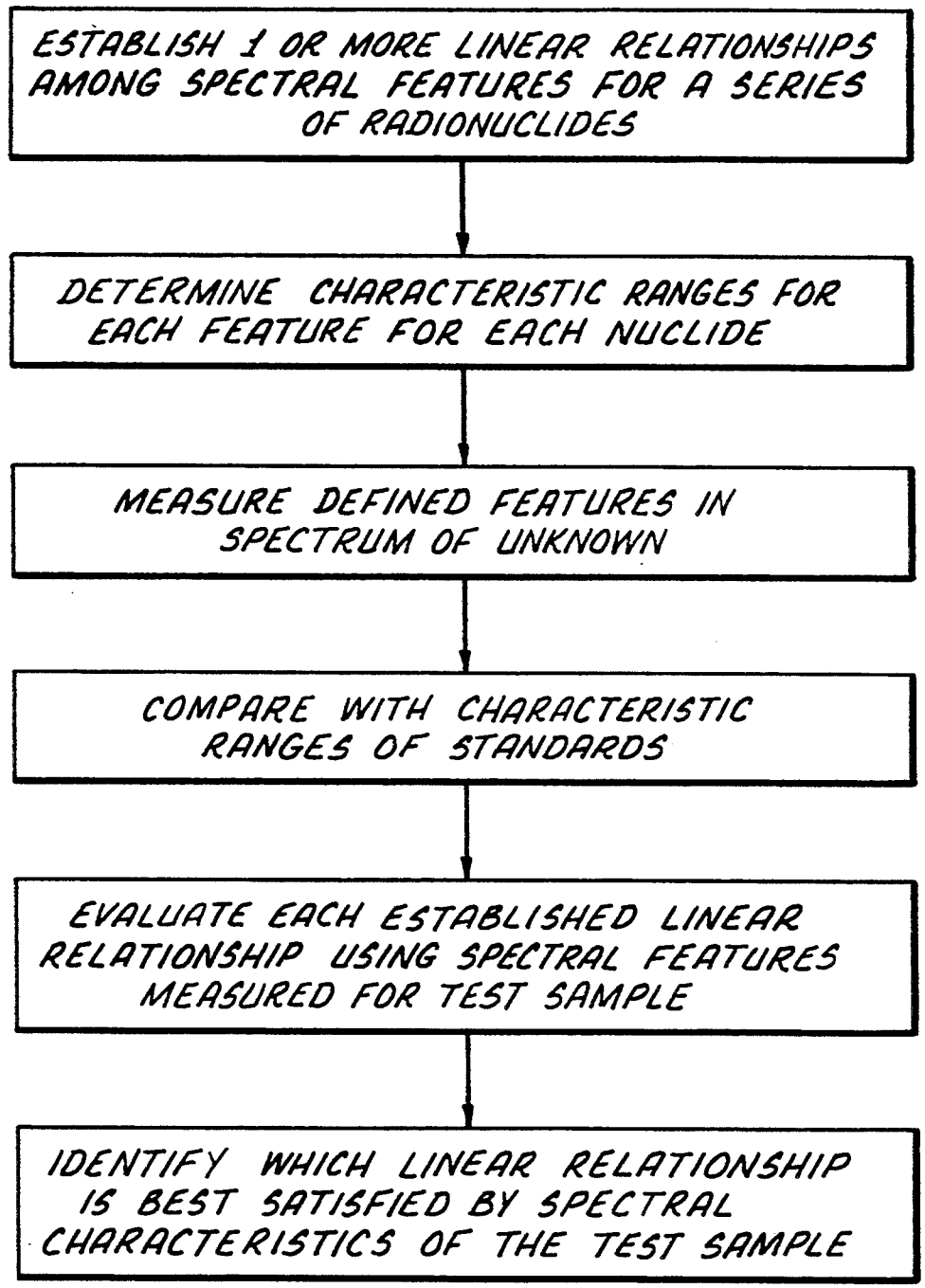
FIG. 2 is a flow diagram illustrating the steps of a method according to the present invention.

To determine the identity of an unknown nuclide, in accordance with a particularly preferred embodiment of the invention a procedure, shown in FIG. 2, comprising the following series of steps may be employed.

Step 1: A spectrum is obtained and the requisite parameters are determined. For example, in methods employing both equations (1) and (2), I, E and F (designated as $I_u$, $E_u$ and $F_u$) are determined for an unknown nuclide as the first step.

Step 2: $E_u$ and $I_u$ are checked against the relevant ranges given in Table II for all nuclides stored in the counter's memory. Only nuclides with quench ranges that include $E_u$ and $I_u$ are candidates for the unknown. Call this candidate group of nuclides, group EI.

Step 3: Using the measured value for $E_u$, I and F values are computed (designated as $I_c$ and $E_c$) from the stored set of equations (Table I) for group EI nuclides.

Step 4: Measures of the percent differences between $I_u$ and $I_c$ as well as $F_u$ and $F_c$ are used to determine the correct nuclide. For example, the parameters are computed:

$$D(I) = 100\ (I_c/I_u - 1) \quad (3)$$

$$D(F) = 100\ (F_c/F_u - 1) \quad (4)$$

$$DD = D(I) D(F) \quad (5)$$

Step 5: Only nuclides from group EI with $DD \leq 15$ are identified as candidates for the unknown. Call these nuclides, group EID. The smallest member of group EID is the unknown. If the group EID is empty, then no match occurs between the unknown and the nuclide library.

Step 6: If there are 2 or more members of group EID, normalize each member of the EID group relative to the minimum DD or $DD_m$ so that $$DD_n = DD/DD_m \quad (6)$$

Any nuclide with $DD_n \leq 4.5$ is the unknown nuclide. If the only nuclide with $DD_n \leq 4.5$ equals 1, then the unknown is uniquely identified. If more than one nuclide has $DD_n \leq 4.5$, then the unknown is one of the members of this group.

Of course, it would be readily apparent to those working in the field that given the identified characteristic equations, the identity of an unknown nuclide may also be determined by appropriate analogous series of calculations other than the specific series of calculations described for this preferred embodiment.

Figure 3:
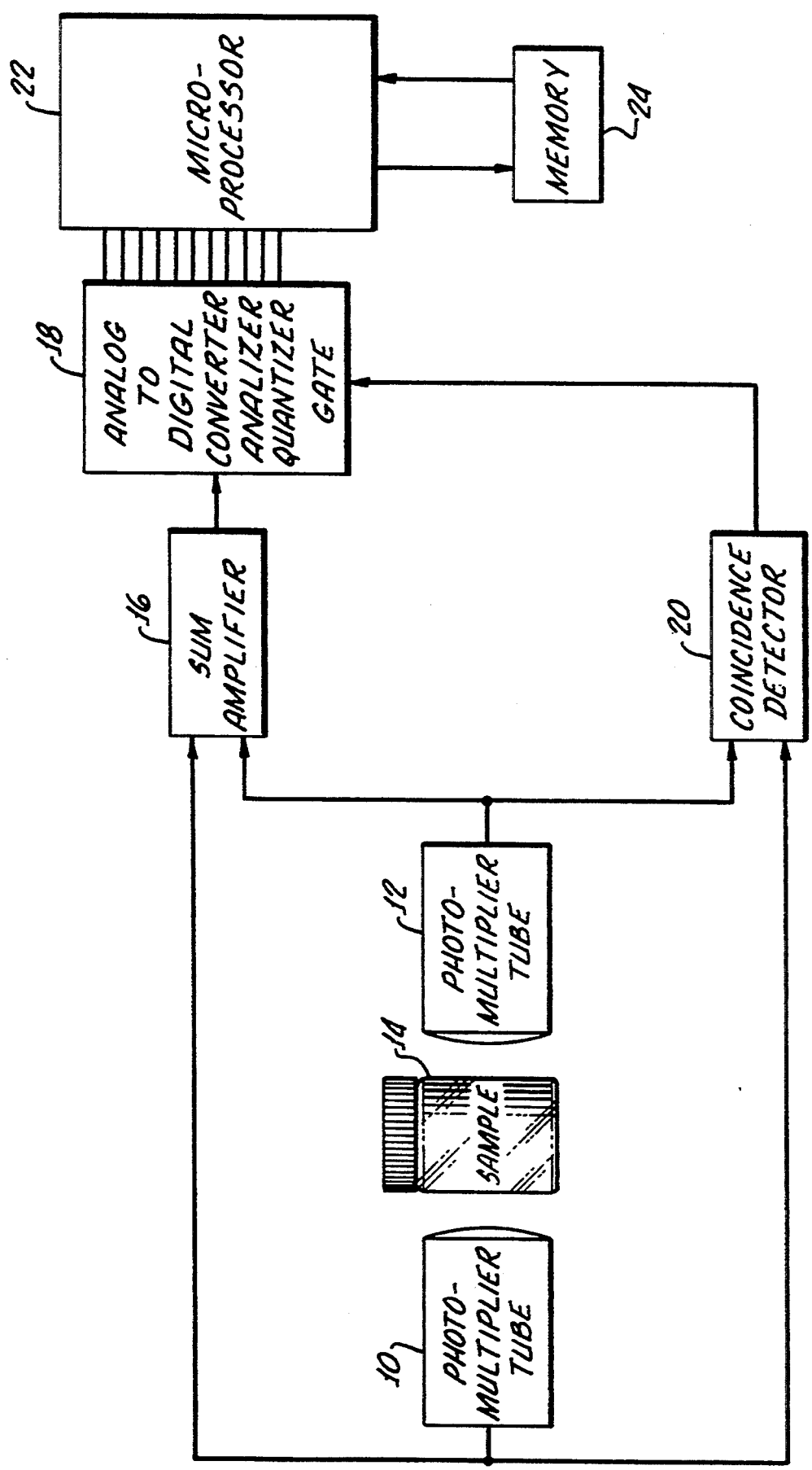
FIG. 3 is a schematic representation of a liquid scintillation counter for practicing the present invention.

As described in greater detail in U.S. Pat. No. 4,742,226 and as generally understood in the art, a conventional electronic liquid scintillation counter system serves as the basis for the apparatus of the present invention. Such a system, shown in FIG. 3 typically includes first and second photomultiplier tubes 10 and 12, respectively which are positioned with an overlapping field of view. The material to be assayed is placed in a sample container 14 which, in the counting mode, is loaded into a centrally-disposed position relative to the first and second photomultiplier tubes. A summing amplifier 16 connected to the output of each of the photomultiplier tubes both combines the respective output signals and increases the amplitude proportionally to the level observed by the photomultiplier tubes. An analyzer or quantizer analog-to-digital converter 18 is connected to the output of the sum amplifier to quantize the signal level and to generate a digital number which identifies the specific magnitude of each received pulse. A coincidence detector 20 or other means is provided to distinguish a scintillation event related to the radionuclide disintegration from unwanted background energy.

In operation, the coincidence detector receives pulses from both photomultiplier tubes and measures the time difference between the received pulses; if the second pulse is received within a predetermined length of time (or time differential window) of the first, such an event is concluded to be related to the radioactive decay event and an enable signal is presented to the analog-to-digital converter to simultaneously gate the combined pulse through to the microprocessor 22. If a pulse is not received at each input of the coincidence detector within the time window, the analog-to-digital converter is not enabled, so that no scintillation event is counted. The digital number representing the counted nuclear event is received by the microprocessor and stored in memory 24 for subsequent use. From the stored digital numbers, a liquid scintillation spectrum may be generated and liquid scintillation spectral parameters as described herein may be determined in a manner known per se.

As would readily be apparent to those skilled in the art, the general liquid scintillation counting system described herein corresponds to a number of heretofore known and/or commercially available scintillation counting systems. Thus, suitable subroutines could be written and incorporated into programming software of the microprocessor of such a system to implement a determination of the specific radionuclide in a test sample by comparing measured spectral characteristics with predetermined spectral characteristics for each of a series of radionuclides of interest and/or evaluating each of a series of established linear equations stored in the microprocessor using the measured spectral characteristics for the test sample to identify the radionuclide in the test sample as the one whose established equation is best satisfied by the determined spectral characteristics of the test sample. Subroutines of the nature described would merely implement the method steps as previously outlined herein. Thus, it is believed that the provision and implementation of such subroutines for use in any number of different heretofore known and/or commercially available liquid scintillation counters would be well within the knowledge of a person skilled in the art given the information as set forth in this application.

The invention may be better understood with reference to the accompanying examples, which are intended for purposes of illustration only and should not be construed in any sense as limiting the scope of the present invention as defined in the claims appended hereto.

EXAMPLE 1

Using a Beckman Instruments LS6000LL liquid scintillation counter, measurements of I, F and E were made on a first set of 10 samples known to contain $Fe^{55}$ only and a second set known to contain $H^3$ only. Each set of samples covered a quench range corresponding to H#'s of 0–260. From this data the following equations were derived.

| | |
|---|---|
| $Fe^{55}$: | I = 0.5063 + 0.6813E |
| | F = −0.71762 + 0.58512E |
| $H^3$: | I = 0.9722 + 0.5084E |
| | F = −0.19148 + 0.39105E |

These results were stored in the memory of the liquid scintillation counter.

The following values were measured for an unknown A: $E_u = 8.253$; $I_u = 5.198$; $F_u = 3.058$. Checking $E_u$ and $I_u$ against the corresponding ranges for the 21 nuclides in Table II (for which the values were determined from equations in Table I) reveals that only $H^3$ satisfies the condition and is therefore the unknown.

EXAMPLE 2

Following the method of Example 1, the following values were measured for an unknown B: $E_u = 3.750$; $I_u = 2.960$; $F_u = 1.476$. Checking E and $I_u$ against the corresponding ranges for the 21 nuclides in Table II reveals that only $H^3$ and $Fe^{55}$ satisfy the condition and are therefore candidates for the unknown. DD($FE^{55}$) = 0.13433 and DD ($H^3$) = 37.33; therefore, $FE^{55}$ is the unknown because only $Fe^{55}$ has DD ≤ 15.

EXAMPLE 3

Following the method of Examples 1 and 2, the following values were measured for unknown C: $E_u = 567$; $I_u = 357.4$; $F_u = 263$. Checking $E_u$ and $I_u$ against the corresponding ranges for the 21 nuclides in Table II reveals that $Cl^{36}$, $Na^{22}$, $P^{32}$, $Rb^{86}$, $Sr^{90}$ and $Na^{24}$ are candidates for the unknown. The following results were then computed for this set of candidates.

| Nuclide | $I_c$ | $F_c$ | D(I) | D(F) | DD | $DD_n$ |
|---|---|---|---|---|---|---|
| $Cl^{36}$ | 425.9 | 433.7 | 19.17 | 64.89 | 1244 | 693.4 |
| $Na^{22}$ | 193.4 | 145.5 | 45.90 | 44.67 | 2050 | 1143 |
| $P^{32}$ | 357.2 | 359.4 | 0.0489 | 36.68 | 1.794 | 1.000 |
| $Rb^{86}$ | 330.8 | 266.7 | 7.443 | 1.421 | 10.57 | 5.892 |
| $Sr^{90}$ | 196.6 | 85.69 | 45.00 | 67.42 | 3034 | 1691 |
| $Na^{24}$ | 210.4 | 186.4 | 41.13 | 29.12 | 1198 | 668 |

$P^{32}$ and $Rb^{86}$ have DD < 15, but only $P^{32}$ has $DD_n \leq 4.5$ and is therefore the unknown.

EXAMPLE 4

Measurements of I, F and E were performed on 3 sets of 8 samples, each set containing one of the following nuclides: $Fe^{59}$, $I^{125}$ and $Cl^{36}$. The following equations were developed relating I and E:

| | |
|---|---|
| $Fe^{59}$ | I = 1.783 + 0.1888E |
| $I^{125}$ | I = 2.620 + 0.3606E |
| $Cl^{36}$ | I = −3.6126 + 0.75753E |

The $I_u$ and $E_u$ values were determined for many unknown samples, and $E_u$ was introduced into each of the above equations so that $I_u$ and $I_c$ could be compared. In most instances, the correct unknown nuclide could be selected ($I_u \approx I_c$). However, at some quench levels, $Fe^{59}$ and $Cl^{36}$ could be confused. In those instances, the use of the FWHM (or F) equations could be used to distinguish the two possibilities.

From the foregoing description, one skilled in the art can readily ascertain the essential characteristics of the invention and, without departing from the spirit and scope thereof, can adapt the invention to various usages and conditions. Changes in form and substitution of equivalents are contemplated as circumstances may suggest or render expedient, and although specific terms have been employed herein, they are intended in a descriptive sense and not for purposes of limitation.

What is claimed is:

1. A method of identifying a radionuclide in a test sample comprising same, said method comprising:
   (a) establishing at least one linear equation for a relationship among liquid scintillation spectral characteristics for each of a series of radionuclides which might be present in the test sample;
   (b) determining characteristic ranges of values of the liquid scintillation spectral characteristics for each of the series of radionuclides;
   (c) measuring the spectral characteristics employed in said at least one linear equation for the test sample; and
   (d) comparing the measured spectral characteristics for the test sample against the determined characteristic values.

2. A method according to claim 1, further comprising:

(e) evaluating each of the established linear equations using the measured spectral characteristics for the test sample; and (f) identifying the radionuclide in the test sample by identifying which established equation is best satisfied by the determined spectral characteristics of the test sample.

3. A method according to claim 1, further comprising:

comparing additional spectral characteristics with a pre-established list of such characteristics to confirm the identity of an unknown.

4. A method according to claim 3, wherein said additional spectral characteristics are selected from the group consisting of energy corresponding with maximum peak height, number of peaks in a spectrum and spectral width corresponding with distance separating spectral inflection points.

5. A method according to claim 1, wherein the step of establishing include a radionuclide equation of the form $$I = C_1 + S_1 E$$

wherein I is isotope center number, E is maximum energy of a sample, $S_1$ is slope of a plot of I versus E and $C_1$ is intercept of a plot of I versus E.

6. A method according to claim 5, wherein the step of establishing further includes a radionuclide equation of the form $$F = C_2 + S_2 E$$

wherein F is full width of spectrum at half maximum height, E is maximum energy of a sample, $S_2$ is slope of a plot of F versus E and $C_2$ is intercept of a plot of F versus E.

7. A method according to claim 6, further comprising computing the following parameters:

$$D(I) = 100 \ (I_c/I_u - 1) \quad (3)$$

$$D(F) = 100 \ (F_c/F_u - 1) \quad (4)$$

$$DD = D(I)D(F) \quad (5)$$

wherein $I_u$ and $F_u$ are measured values and $I_c$ and $F_c$ are calculated values.

8. A method according to claim 7, wherein the radionuclide is identified as having a DD value $\leq 15$.

9. A method according to claim 7, further comprising:

comparing additional spectral characteristics with a pre-established list of such characteristics to confirm the identity of an unknown.

10. A method according to claim 9, wherein said additional spectral characteristics are selected from the group consisting of energy corresponding with maximum peak height, number of peaks in a spectrum and spectral width corresponding with distance separating spectral inflection points.

11. Apparatus for identifying a radionuclide in a test sample comprising same for use with a liquid scintillator, said apparatus comprising:

transducer means for converting energy released by the decay of radionuclides into electrical pulses proportional thereto;

signal processing means connected to said transducer means for eliminating pulses which do not fall within a predetermined time differential window so as to screen out pulses which are not related to the decay of a radionuclide;

quantizing means connected to the signal processing means for converting each pulse into a representative digital signal corresponding to a liquid scintillation spectrum; and processing means connected to the quantizing means for receiving digital signals from the quantizing means, said processing means including means for determining liquid scintillation spectral characteristics from the digital signals, storage means for storing at least one predetermined radionuclide equation correlating liquid scintillation spectral parameters for each of a series of radionuclides which might be present in the test sample and characteristic ranges of values of the liquid scintillation spectral characteristics for each of the series of radionuclides, and means for determining if the determined liquid scintillation spectral characteristics for the test sample fall within the characteristic ranges of values for any of the series of radionuclides.

12. Apparatus according to claim 11, wherein the processing means further includes means for determining whether the determined liquid scintillation spectral characteristics satisfy any one of the stored radionuclide equations so as to indicate the presence of the radionuclide of the equation that is satisfied.

13. Apparatus according to claim 11, wherein the stored radionuclide equations take the form $$I = C_1 + S_1 E$$

wherein I is isotope center number, E is maximum energy of a sample, $S_1$ is slope of a plot of I versus E and $C_1$ is intercept of a plot of I versus E.

14. Apparatus according to claim 13, wherein a second radionuclide equation is stored in the processing means for each of the series of radionuclides, said second radionuclide equation taking the form $$F = C_2 + S_2 E$$

wherein F is full width of spectrum at half maximum height, E is maximum energy of a sample, $S_2$ is slope of a plot of F versus E and $C_2$ is intercept of a plot of F versus E.

15. Apparatus according to claim 14, wherein the processing means further comprises means for calculating the following parameters:

$$D(I) = 100 \ (I_c/I_u - 1) \quad (3)$$

$$D(F) = 100 \ (F_c/F_u - 1) \quad (4)$$

$$DD = D(I)D(F) \quad (5)$$

wherein $I_u$ and $F_u$ are measured values and $I_c$ and $F_c$ are calculated values.

16. Apparatus according to claim 11, wherein the processing means further comprises means for comparing additional spectral characteristics with a pre-established list of such characteristics to confirm the identity of an unknown.

17. Apparatus according to claim 16, wherein said additional spectral characteristics are selected from the group consisting of energy corresponding with maximum peak height, number of peaks in a spectrum and spectral width corresponding with distance separating spectral inflection points.

* * * * *